Oct. 10, 1950 J. DOIRON 2,525,257
SHIFTING MECHANISM FOR BELT-DRIVES
Filed Aug. 1, 1947 4 Sheets-Sheet 1

INVENTOR.
JEAN DOIRON
BY
George W. Saywell
ATTORNEY.

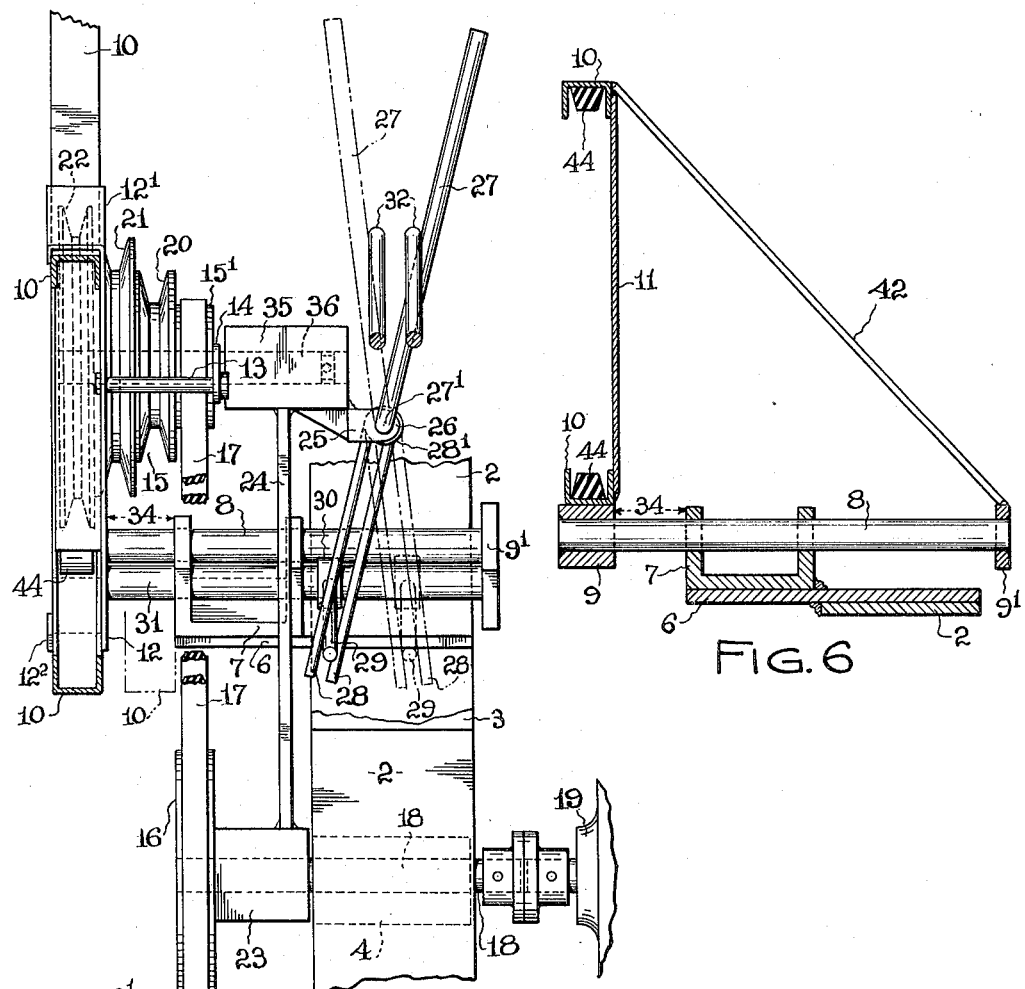

Patented Oct. 10, 1950

2,525,257

UNITED STATES PATENT OFFICE 2,525,257

SHIFTING MECHANISM FOR BELT DRIVES

Jean Doiron, Cleveland, Ohio

Application August 1, 1947, Serial No. 765,332

7 Claims. (Cl. 74—242.3)

The invention relates to belt-drives and particularly to a mechanism for shifting the drive from one pair of aligned pulleys of two sets of pulleys to another selective pair of aligned pulleys of the two sets of pulleys.

The annexed drawings and the following description set forth in detail the aforesaid invention in shifting mechanism for belt-drives, such drawings and description disclosing, however, only one form in which the invention may be embodied.

In said annexed drawings:

Figure 1 is a side elevation of the improved shifting mechanism for belt-drives, the view particularly showing the relative positions of the several parts after the belt has been disengaged from one pair of aligned pulleys by means of which it effects its driving function, preparatory to shifting the belt into alignment with another pair of aligned pulleys and engaging it with the last-mentioned pair of pulleys;

Figure 4 is a plan view of the several elements in the respective positions shown in Figure 3;

Figure 5 is a transverse section, taken from the plane indicated by the line 5—5, Figure 1;

Figure 6 is a transverse section, taken in the planes indicated by the line 6—6, Figure 1;

Figure 7 is a transverse section, taken in the plane indicated by the line 7—7, Figure 1; and Figure 8 is a plan section, taken in the plane indicated by the line 8—8, Figure 1.

Figure 1:
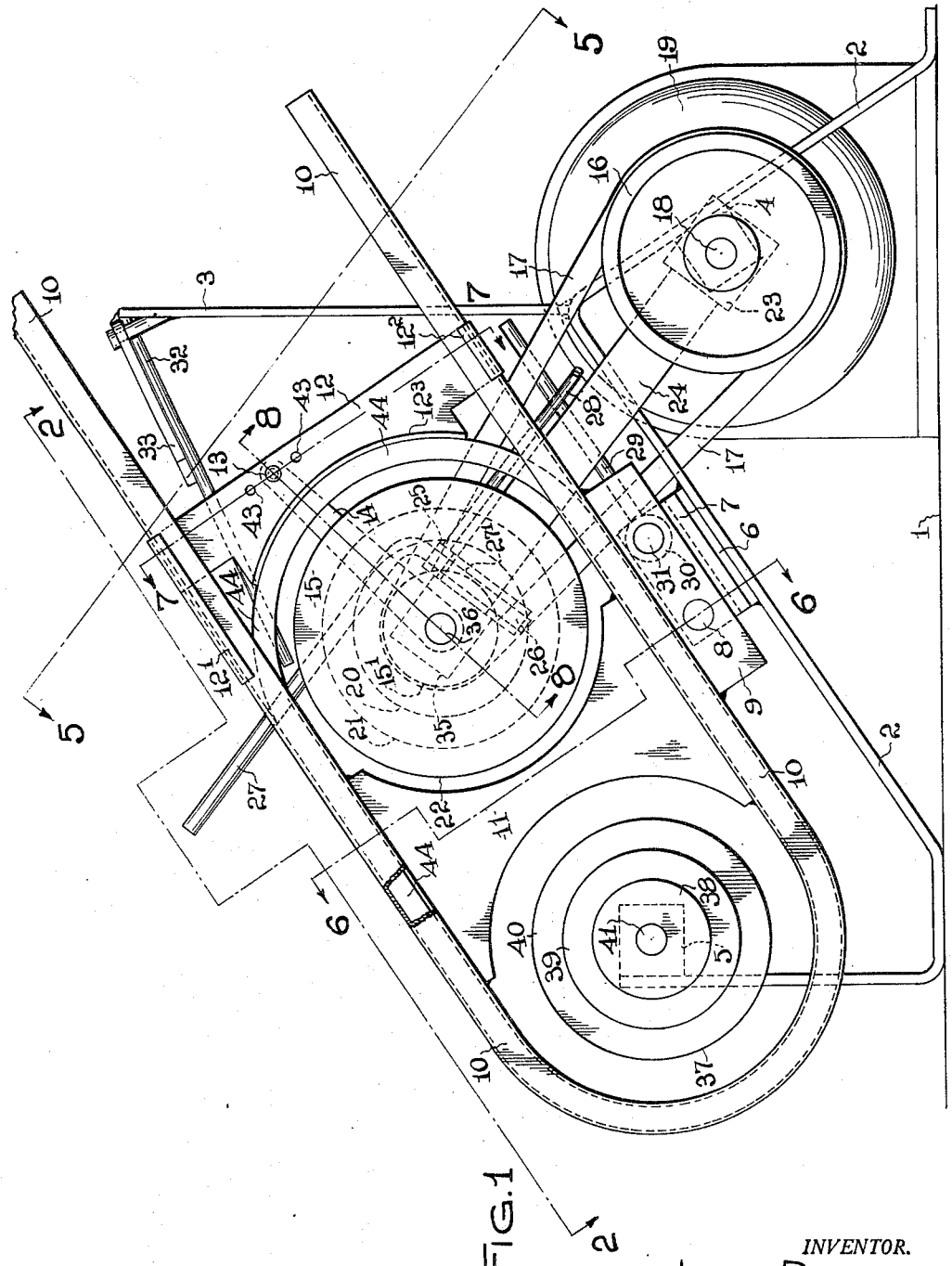

Referring to the annexed drawings in which the same parts are indicated by the same respective numbers in the several views, a supporting frame 2—3 is mounted upon a main base 1 and is of an angular formation clearly appearing in Figures 1 and 3 suitable for supporting the various elements of the invention hereinafter described in detail.

The several parts of the supporting frame 2—3 are substantially rectangular in cross-section, and are disposed substantially centrally, Figure 5, of the several shifting elements hereinafter described. Secured to an inclined leg of the frame is a bearing 4 for the shaft 18 of a driving motor 19. To a vertical leg of the supporting frame is secured a bearing 5 for the shaft of a fixed driven pulley system 37, and welded to an upper inclined extension 3 of the supporting frame are a pair of longitudinally-extending spaced arms 32. The space between the arms 32 denotes the position of a certain actuating lever 27 when an intermediate pair of aligned pulleys are engaged by the driving belt, the respective positions for this actuating lever 27, when the driving belt engages respective outside aligned pulleys, being exteriorly of the spaced arms 32, either on one side or the other, all as will be hereinafter fully described upon reference to the accompanying drawings.

Figure 2:
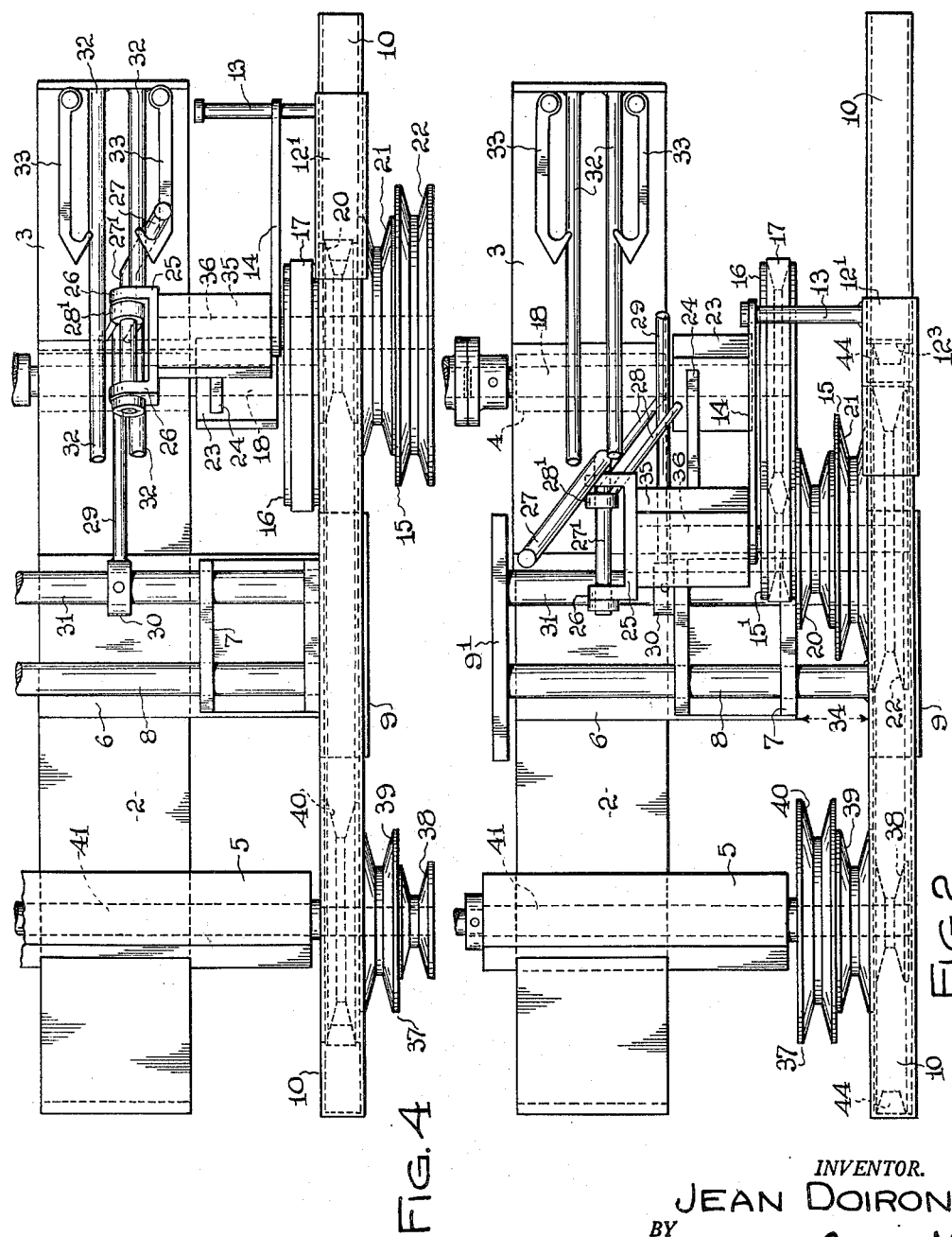
Figure 2 is a plan view of the elements in the several positions shown in Figure 1.
Figure 3:
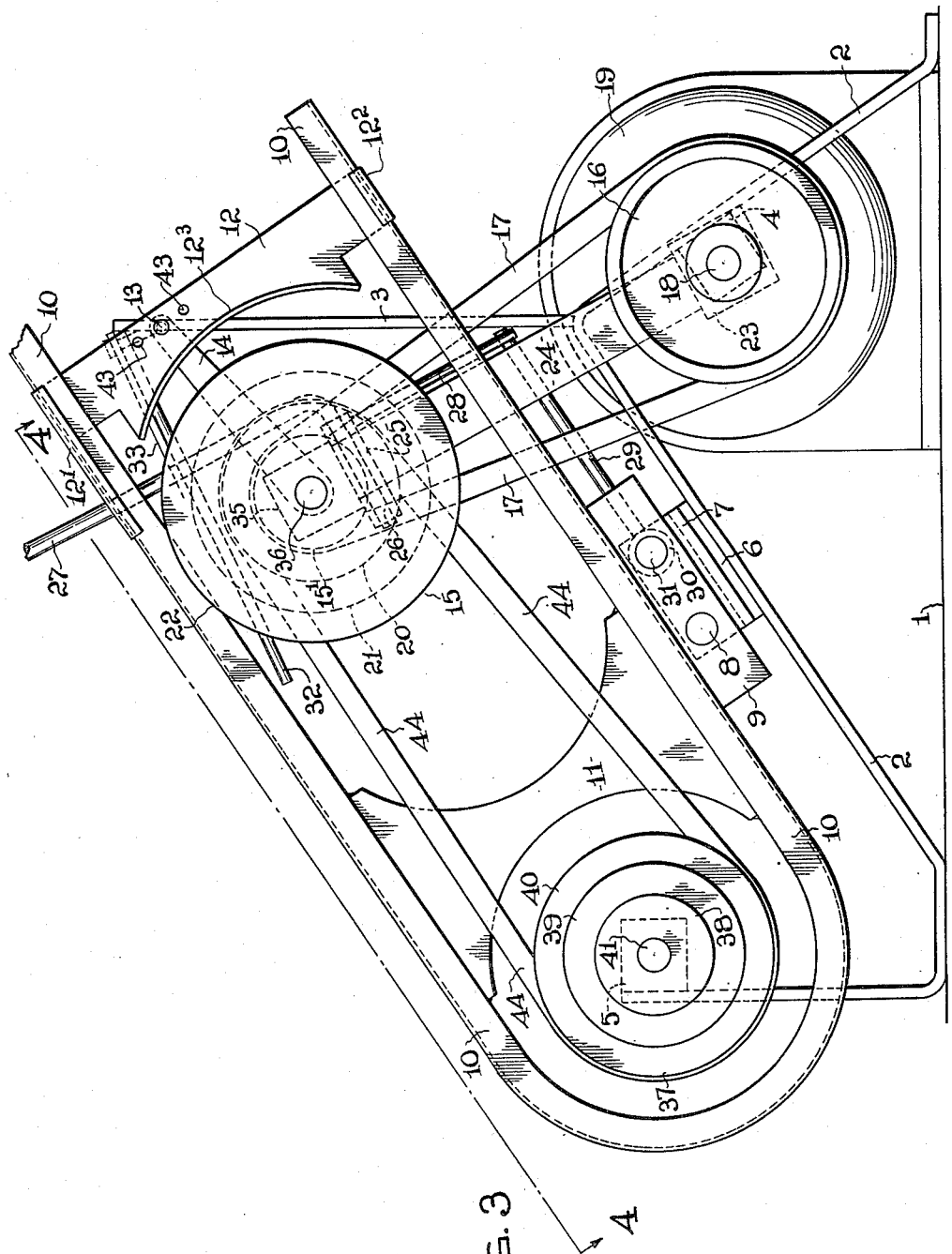
Figure 3 is a side elevation of the elements in their several respective positions after the belt has been shifted and engaged with the other pair of aligned pulleys.

Welded to the upper surface of and extended at one side transversely of an inclined intermediate portion of the supporting frame 2 is a plate 6, Figures 1, 3, and 6, to the upper surface of whose extended portion is welded a channel 7 in the opposed arms of which is slidably mounted a rod 8 of a length substantially equal to the transverse dimension of the mechanism. The rod 8 is welded at one end to an elongated block 9 and at its opposite end to an elongated plate $9^1$, Figures 2, 4, and 6. Secured to and mounted on the block 9 is an elongated U-shaped channel member 10 clearly appearing in Figures 1, 3, and 6. Adjacent the closed end of the U-shaped channel member 10 and welded to the upper and lower legs thereof is a web 11, Figures 1 and 6, whose forward and rear edges are of arcuate formation complementary to the periphery of two pulley systems 15 and 37. An inclined frame brace 42, Figure 6, is secured at its respective ends to the top of the web 11 and to the arm $9^1$. The pulley system 15 is one which is shiftable toward and from the pulley system 37, which latter is a fixed pulley system, the shifting of the pulley system 15 being in an arcuate path as hereinafter fully described and as appears from the two positions thereof shown in Figures 1 and 3.

Somewhat spaced from the free ends of the legs of the U-shaped channel member 10 is a web 12, Figures 1, 3, and 7, having upper and lower U-shaped edges $12^1$ and $12^2$, of which the upper edge $12^1$ is elongated, these edges $12^1$ and $12^2$ fitting over and adapted to slide on the channel formation 10. This web 12 has an outwardly and laterally extended flange $12^3$ of arcuate formation conforming to the periphery of the pulley system 15, this flange $12^3$ being disposed in a space substantially defined by the planes of the opposed legs of the channel 10, Figures 7 and 8.

Secured to the movable web 12 and extended inwardly transversely thereof is a pin 13, Figures 2, 4, 7, and 8, pivoted in and adapted to slide transversely of one end of a longitudinally-extending plate 14, Figures 1 and 3, whose opposite end is pivotally mounted on the shaft 36 upon which the adjustable pulley system 15 is mounted. This end of the plate 14 abuts a block 35 pinned to one end of the shaft 36, Figure 8.

One of the pulleys of the system 15, viz., "15¹," Figures 1, 3, 4, 5, and 8, is driven by a belt 17 which also engages a pulley 16 secured to the shaft 18 of the driving motor 19. The pulley system 15 also comprises, as shown herein for purposes of illustration, a small pulley 20, a large pulley 22, and an intermediate pulley 21, Figure 5. These pulleys are respectively complementary to the pulleys 38, 39, and 40 of the fixed pulley system 37 which are secured to a shaft 41 journalled in the block 5 and from which the take-off of power is effected, Figures 2 and 4.

Journalled on the driving motor shaft 18 is a block 23, Figure 5, to which is welded one end of an arm 24 to whose other end is welded the aforementioned block 35, Figures 1, 3, and 8. It is thus evident that the system of pulleys 15 can swing in an arc around the axis of the driving motor shaft as a center. Welded to and beneath the block 35 is a channel-shaped bracket 25, Figures 2, 4, and 5, having spaced tubular arms 26 within which is journalled an angular end portion 27¹ of an actuating lever 27. Secured to the angular end portion 27¹ of the actuating lever 27 is a hub portion 28¹ of two spaced downwardly inclined rods 28 the space between which and adjacent its bottom is intersected by an elongated pin 29 having an end hub portion 30 secured to a rod 31. This rod 31 is parallel to the aforementioned rod 8 and also is welded at one end to the block 9 and at its opposite end to the plate 9¹, and likewise slides through the channel 7.

The mechanism described serves to laterally shift the rod 31 and, consequently, the channel 10 and its contained belt 44, and the rod 8 to a maximum extent indicated by the space 34, Figures 2, 5, and 6. When the mechanism is shifted laterally, the belt 44 which drives the system 37 of pulleys is shifted from one pair of aligned pulleys to another pair. Of course, the shifting elected may be only a part of the maximum distance 34, i. e., from one pair of aligned pulleys to an adjacent pair.

The pair of spaced arms 32, which are rearwardly longitudinally-extended from the top of the frame member 3, are of a length so that their rear free ends are adjacent the actuating lever 27 in the position of the latter shown in Figures 1 and 2, and can receive in the space between them this arm 27 as it is moved forwardly. However, dependent upon its transverse position, the actuating lever 27 can be moved forwardly between the arms 32 and also on either side thereof. Hooks 33 pivotally secured at one end to the frame member 3 are provided for engaging the actuating lever 27 in its several forward positions, a right forward position being shown in Figures 3 and 4.

When the system 15 of pulleys is moved forwardly and rearwardly, the belt 44 is respectively placed in driving position and in idle position. A forward movement of the system 15 of pulleys causes the particular pulley with which the belt 44 is aligned to engage the belt 44 and tighten it for driving engagement. A rearward movement of the system 15 of pulleys causes the transverse flange 12³ of the sliding channel 12 to push the belt, Figure 8, rearwardly and away from the pulley of the system 37 with which it has been engaged, Figure 2. The action on the belt 44 by a forward movement is to extract it from the channel housing 10, as shown in Figure 3, and the effect on the belt 44 by a rearward movement is to pass it into the channel of the housing 10, as shown in Figure 1.

Assuming that the several elements are in the respective positions shown in Figures 1, 2, and 5, which are positioned when the belt 44 is loose or disengaged and in alignment with the pulleys 22 and 38, such respective positions are the first ones assumed by the elements when it is desired to effect a disengagement of the belt 44 from the pulleys 22 and 38 and a shifting of the belt 44 to another pair of aligned pulleys, either pulleys 21 and 39 or pulleys 20 and 40. The shifting illustrated in the drawings is a shifting of the belt 44 from the pulleys 22 and 38 to the pulleys 20 and 40 and such completely shifted position of the belt 44 and the engagement thereof with the pulleys 20 and 40 is shown in Figures 3 and 4.

The position of the several elements when the belt 44 was engaged with the pulleys 22 and 38 is the same as that shown in Figures 3 and 4 except that, in Figures 3 and 4, the belt is engaged with the pulleys 20 and 40, and the actuating lever 27 and some connected elements are in position for engagement of the belt 44 with the pulleys 20 and 40. The first step in shifting from pulleys 22 and 38, Figures 1 and 2, to pulleys 20 and 40, Figures 3 and 4, which results in the position of the elements shown in Figures 1 and 2, is a rearward actuation of the lever 27 which effects, through the portion 27¹ of the lever 27, the channel member 25, the block 35, the shaft 36, the arm 24, and the journal block 23, a rearward arcuate movement of the pulley system 15, resulting in a sliding of the channel web 12 upon the channel 10, Figure 7, the portion 12³ of the web 12 pushing the belt 44 rearwardly away from the pulley 38, thus resulting in the several positions of the elements shown in Figures 1 and 2, in which the belt 44 is entirely free of the pulley 38 and, in fact, is so far removed therefrom as to clear the plane intersected by the rear peripheral edge of the large pulley 40. The rearward movement of the web portion 12³ is not sufficient to cause the belt 44 to intersect the plane of the front peripheral edge of the pulley 22.

Then, the actuating lever 27 is moved to the right to the dot-and-dash position shown in Figure 5 which, through the pair of rods 28 and the rod 29, moves the rods 8 and 31 to the left, as indicated by the dot-and-dash position of the members 28 and 29 in Figure 5, this movement being sufficient to move the channel 10 carrying the belt 44 to a position wherein the belt 44 is aligned with the pulleys 21 and 39, or is aligned with the pulleys 20 and 40, whichever is desired. In the accompanying drawings, the movement is shown as being a complete one, for the number of pulleys shown by way of illustration, and is a left-hand movement equal to the distance 34, Figures 2, 5, and 6. Such complete movement aligns the belt 44 with the pulleys 20 and 40. Then, the actuating lever 27 is moved forwardly into the area adjacently above the upper rod 32, and held in that position by a hook 33. The desired drive is then effected from the belt 17 through the pulley 20 to the pulley 40 to the power take-off shaft 41.

The forward movement of the actuating lever 27 moves the channel 12 by means of the arm 14 and pin 13 forwardly and also moves the pulley system 15 forwardly in an arcuate path by means of the pivoted arm 24, block 35, and shaft 36, so that the rear of the belt 44 eventually engages the pulley 40, the aligned pulley 20 of the pulley system 15 engaging the forward end of the belt by reason of the forward movement of the pulley system 15. The belt 44 is then in engaged position for effecting the driving of the pulley 40 and the shaft 41 from the pulley 20 driven from the belt 17. Desired belt-tightening adjustment is provided for by a plurality of holes 43, Figures 1 and 7, for pivotally connecting the pin 13 to the web 12.

It is evident that during the aforedescribed shifting of the belt from one pair of pulleys to another pair, the motor 19 can be continuously running and that the pulley system 15 can be continuously turning but that no movement can be transferred by the belt 44 to the pulley system 37 until the pulley system 15 is moved into its forward position wherein the pulley 20 has pulled the belt 44 a sufficient distance to cause it to engage the pulley 40.

What I claim is:

1. Means for shifting a transmission belt on two pulley sets having aligned pulleys comprising means mounting one set for arcuate movement of its axis, a belt-carrying housing, means for moving the housing axially of the pulley sets, and means for effecting the arcuate movements of the one pulley set.

2. Means for shifting a transmission belt on two pulley sets having aligned pulleys, characterized as in claim 1, in which an operating shift lever is connected to the one pulley set and the housing to effect the arcuate movements of the pulley set and the axial movements of the housing.

3. In a transmission system having two pulley sets of aligned pulleys, a belt for driving the pulleys of one set from the respectively aligned pulleys of the other set, a primary shaft and means for driving the same, and means for driving the pulleys of said "other set" from the primary shaft, belt-shifting mechanism comprising means for mounting the driving pulley set for pivotal movement in an arcuate path about the axis of the primary shaft to vary the distance between the axes of the two pulley sets, a slidably mounted belt-mounting housing of channel cross-section into which the belt can be passed and from which it can be extracted, said housing being spaced from the driving position of the belt, means for effecting the arcuate movements of the driving pulley set and movements of the housing in a direction transverse to that of the arcuate path of movement of the driving pulley set, and means engaging the belt for passing the same into and extracting the same from the housing upon respective arcuate movements of the driving pulley set in opposite directions.

4. In a transmission system having two pulley sets of aligned pulleys, a belt for driving the pulleys of one set from the respectively aligned pulleys of the other set, a primary shaft and means for driving the same, and means for driving the pulleys of said "other set" from the primary shaft, belt-shifting mechanism comprising means for mounting the driving pulley set for pivotal movement in an arcuate path about the axis of the primary shaft to vary the distance between the axes of the two pulley sets, an actuating lever connected to the mounting means for effecting such arcuate movements, a slidably mounted belt-mounting housing of channel cross-section into which the belt can be passed and from which it can be extracted, said housing being spaced from the driving position of the belt, the actuating lever being pivotally mounted in the aforementioned mounting means and connected to the housing for effecting movement thereof in a direction transverse to that of the arcuate path of movement of the driving pulley set, and means engaging the belt for passing the same into and extracting the same from the housing upon respective rearward and forward arcuate movements of the driving pulley set.

5. In a transmission system having two pulley sets of aligned pulleys, a belt for driving the pulleys of one set from the respectively aligned pulleys of the other set, a primary shaft and means for driving the same, and means for driving the pulleys of said "other set" from the primary shaft, belt-shifting mechanism comprising means for mounting the driving pulley set for pivotal movement in an arcuate path about the axis of the primary shaft to vary the distance between the axes of the two pulley sets, an actuating lever connected to the mounting means for effecting such arcuate movements, a slidably mounted belt-mounting housing of channel cross-section into which the belt can be passed and from which it can be extracted, said housing being spaced from the driving position of the belt, the actuating lever being pivotally mounted in the aforementioned mounting means and connected to the housing for effecting movement thereof in a direction transverse to that of the arcuate path of movement of the driving pulley set, a web slidably mounted on the housing and engaging the belt for effecting a movement of the latter into the housing upon movement of the driving pulley set in one direction thus to move the belt out of engagement with the driven pulley set, means pivotally connecting the web to the first-mentioned mounting, a movement of the driving pulley set in the opposite direction extracting the belt from the housing and moving it into driving engagement with the driven pulley set.

6. In a transmission system having two pulley sets of aligned pulleys, a belt for driving the pulleys of one set from the respectively aligned pulleys of the other set, a primary shaft and means for driving the same, and means for driving the pulleys of said "other set" from the primary shaft, belt-shifting mechanism comprising means for mounting the pulleys of one set for arcuate movement about the axis of the primary shaft as a center, a channel housing within which the belt is mounted and into which it can be passed and from which it can be extracted, said housing being spaced from the driving position of the belt, a support, a bar slidably mounted upon the support and carrying said housing, a second bar also slidably mounted upon the support and aligned with said first bar, a hub member secured to said second bar and having an elongated extension, a shaft upon which the pulleys of the one set are mounted, a bracket secured to the means for moving the one pulley set in its arcuate path, an actuating lever having an angular end portion pivotally mounted in the bracket, means secured to the angular portion of the lever and engaging the two sides of the hub extension, a web longitudinally slidably mounted upon the housing, means pivotally mounted upon the shaft for sliding the web upon the arcuate movements of the one pulley set, the web having a flange portion engaging the belt in one pivotal position of the driving pulley set to force the belt away from the driven pulley set and into the housing as the driving pulley set moves into its other position, and the pulleys of the driving pulley set engaging the belt for driving engagement therewith and extracting the belt from its housing and pulling it into engagement with the driven pulley set as the driving pulley set moves into its other pivotal position.

7. In a transmission system having two pulley sets of aligned pulleys, a belt for driving the pulleys of one set from the respectively aligned pulleys of the other set, a primary shaft and means for driving the same, and means for driving the pulleys of said "other set" from the primary shaft, belt-shifting mechanism comprising a bearing member within which the primary shaft turns, an arm secured at one end to said bearing member, a block secured to the other end of said arm, a shaft secured at one end in said block, one of the pulley sets being mounted on the shaft, a channel housing within which the belt is mounted and into which it can be passed and from which it can be extracted, said housing being spaced from the driving position of the belt, a support, a bar slidably mounted upon the support and carrying said housing, a second bar also slidably mounted upon the support and alinged with said first bar, a hub member secured to said second bar and having an elongated extension, a bracket secured to the block, an actuating lever having an angular end portion pivotally mounted in the bracket, spaced arms secured to the angular portion of the lever and engaging the two sides of the hub extension, a web longitudinally slidably mounted upon the housing, a pin secured to and extended from the web, an arm pivotally mounted at one end on the shaft between the block and the pulley set and slidably mounted at its opposite end on the pin, the web having a flange portion engaging the belt in one pivotal position of the pulley set to force the belt away from the driven pulley set and into the housing as the driving pulley set moves into its other position, and the pulleys of the driving pulley set engaging the belt for driving engagement therewith and extracting the belt from its housing as the driving pulley set moves into its "one" pivotal position.

JEAN DOIRON.

REFERENCES CITED

The following references are of record in the file of this patent:

UNITED STATES PATENTS

| Number | Name | Date |
|---|---|---|
| 1,192,731 | Faltermayer | Mar. 5, 1940 |
| 2,263,438 | Garvin | Nov. 18, 1941 |